(12) United States Patent
Gelb et al.

(10) Patent No.: US 7,285,047 B2
(45) Date of Patent: *Oct. 23, 2007

(54) METHOD AND SYSTEM FOR REAL-TIME RENDERING WITHIN A GAMING ENVIRONMENT

(75) Inventors: Daniel G. Gelb, Redwood City, CA (US); Thomas Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 604 days.

This patent is subject to a terminal disclaimer.

(21) Appl. No.: 10/688,148

(22) Filed: Oct. 17, 2003

(65) Prior Publication Data

US 2005/0085296 A1    Apr. 21, 2005

(51) Int. Cl.
G06F 17/00 (2006.01)
G06F 19/00 (2006.01)

(52) U.S. Cl. ............... 463/31; 463/30; 463/32; 463/33; 463/34; 463/40; 463/41; 463/42; 345/419

(58) Field of Classification Search ............ 463/7, 463/30–34, 35, 42, 1, 36; 345/418–422, 345/581, 585
See application file for complete search history.

(56) References Cited

U.S. PATENT DOCUMENTS

| | | | |
|---|---|---|---|
| 4,710,873 A * | 12/1987 | Breslow et al. ............ | 463/31 |
| 5,616,078 A * | 4/1997 | Oh .............................. | 463/8 |
| 6,009,210 A * | 12/1999 | Kang .......................... | 382/276 |
| 6,227,974 B1 * | 5/2001 | Eilat et al. .................. | 463/40 |
| 6,335,977 B1 * | 1/2002 | Kage ........................... | 382/107 |
| 6,476,812 B1 * | 11/2002 | Yoshigahara et al. ...... | 345/427 |
| 6,522,312 B2 * | 2/2003 | Ohshima et al. ........... | 345/8 |
| 6,664,956 B1 * | 12/2003 | Erdem ........................ | 345/419 |
| 6,677,967 B2 * | 1/2004 | Sawano et al. ............. | 715/839 |
| 6,795,068 B1 * | 9/2004 | Marks ......................... | 345/419 |
| 6,807,290 B2 * | 10/2004 | Liu et al. .................... | 382/118 |
| 6,853,398 B2 * | 2/2005 | Malzbender et al. ...... | 348/14.09 |
| 6,890,262 B2 * | 5/2005 | Oishi et al. ................. | 463/31 |
| 6,970,177 B2 * | 11/2005 | Yamada et al. ............. | 345/629 |
| 6,977,660 B2 * | 12/2005 | Fujiwara et al. ........... | 345/582 |
| 6,980,333 B2 * | 12/2005 | Cok ............................ | 358/450 |
| 7,016,824 B2 * | 3/2006 | Waupotitsch et al. ...... | 703/6 |
| 7,048,630 B2 * | 5/2006 | Berg et al. .................. | 463/30 |
| 7,057,662 B2 * | 6/2006 | Malzbender ................ | 348/373 |
| 7,098,920 B2 * | 8/2006 | Marschner et al. ......... | 345/473 |
| 7,121,946 B2 * | 10/2006 | Paul et al. ................... | 463/36 |

(Continued)

OTHER PUBLICATIONS

Laurentini, Aldo. "The Visual Hull Concept for Silhouette-Based Image Understanding", Feb. 2, 1994. IEEE Transactins on Pattern Analysis and Machine Intelligence, vol. 16, No. 2.*

*Primary Examiner*—Xuan M. Thai
*Assistant Examiner*—Meagan Thomasson

(57) ABSTRACT

A method and system for real-time rendering within a gaming environment. Specifically, one embodiment of the present invention discloses a method of rendering a local participant within an interactive gaming environment. The method begins by capturing a plurality of real-time video streams of a local participant from a plurality of camera viewpoints. From the plurality of video streams, a new view synthesis technique is applied to generate a rendering of the local participant. The rendering is generated from a perspective of a remote participant located remotely in the gaming environment. The rendering is then sent to the remote participant for viewing.

20 Claims, 8 Drawing Sheets

U.S. PATENT DOCUMENTS 7,127,081 B1 * 10/2006 Erdem .................... 382/103
2003/0130035 A1 * 7/2003 Kanarat .................... 463/31
2004/0102247 A1 * 5/2004 Smoot et al. .................. 463/36

* cited by examiner

300B

(From 330)

↓

Generating the Real-Time Renderings from a Perspective Taken From a Second Location of the Remote Participant with Respect to a First Location of the Local Participant Within a Coordinate Space of the Virtual Gaming Environment
340

↓

Enabling a Change in at Least One of the First and Second Locations by Allowing the Local Participant and the Remote Participant to Navigate Through the Coordinate Space of the Virtual Gaming Environment
350

↓

Modifying the Real-Time Renderings to Reflect the Change in at Least One of the First and Second Locations
360

↓

( End )

FIG. 3B

METHOD AND SYSTEM FOR REAL-TIME RENDERING WITHIN A GAMING ENVIRONMENT

TECHNICAL FIELD

The present invention relates to the field of gaming, and more particularly to a method for enabling real-time image rendering within a gaming environment for enhancing an interactive gaming experience.

BACKGROUND ART

A gaming environment creates a fantasy world within which a player can immerse himself or herself. The player exists within the fantasy world in the form of a character that interactively participates in unfolding events of the fantasy world. The actions undertaken by the character, as dictated by the player, affect and shape events in the fantasy world. These events may be continually occurring in real time whether or not that player is playing the fantasy world. As such, just as in reality, a player in a fantasy world can develop his or her character in order to reach certain goals as set forth within the context of the gaming environment.

The character can be perceived as an extension of the player. As such, these games in some circles are also referred to as role playing games (RPG). The player can select many roles within which to exist in the fantasy world. For example, within one RPG that is associated with one gaming environment, the player may decide his or her character to be a knight, a peasant, a sorceress, or any number of male and female characters.

Moreover, many RPGs are configured to have multiple players simultaneously interacting within the gaming environment. For RPGs that support multiple players, the players can be coupled together through any network. For example, players can be coupled together through a geographically limited local area network (LAN), or a network that has a wider geographic scope, such as a wide area network (WAN), or even the Internet. As such, on-line gaming provides for a gaming environment that can encompass a few players, or millions of players.

The player's experience is an important feature within an RPG. The closer a player's experience is to reality, the better the experience. That is, RPGs are continually trying to enhance interactions within the gaming environment to portray the most realistic experience for the player. For example, the reality created within the gaming environment is personified through the character for the associated player. At present, the characters are graphically based avatars that represent the player within the gaming environment. The graphically based avatars of the prior art comprise geometric avatars that have been generated and modeled by an artist in advance. As such, the graphically based avatars are essentially character models. Within a multi-player RPG, a player views other players through their avatars. Additionally, players can adversely or cooperatively interact with each other within the gaming environment. That is, certain players become adversaries or become partners. For example, in a multi-player gaming environment, a player can team up with other players, or fight against other players or computer generated characters.

However, avatars in the form of character models limit the realism strived for by the gaming experience. Response times for the character models are not real-time, and in a visual sense, the character models do not promote a sense of realism. The generated character models that portray themselves to other players through stored renditions of the character are limited to the pre-designed and developed character actions. For example, emotions of the character model are determined by typed commands by the player dictating which emotion the avatar should portray to other players. By typing the commands for emotion, the element of real-time expression and action is lost both through a translation and selection of emotion by the player and through the time lag needed to type in the commands.

Additionally, these emotions are canned facial features that are incorporated into the character model and then portrayed to the other players. That is, the canned facial features are predetermined, predesigned, and prestored facial features accessible for use in the character model. As a result, emotions are limited by the number of canned facial features and emotions that are developed and stored in memory. As such, the realism experienced by the player is limited by the reliance on character models to personify the player within the gaming environment.

As another example, eye contact as an extension of reality that is portrayed through character models also suffers from a similar lack of realism. Eye contact between players can be an effective form of communication. Trust, mistrust, fear, anger, and a whole host of other emotions can be conveyed to other players through eye contact, or the deliberate avoidance of eye contact. However, eye contact that is portrayed through character models between players is not fully realistic, since a player is not truly viewing the other player in person, but a previously created character model representation of that other player. As such, determining the true emotion experienced between players is difficult since players can hide their true and realistic emotions by typing false emotions to be portrayed by their avatars within the gaming environment.

Therefore, prior art methods of providing gaming environments are limited to graphically based avatars for effecting the gaming experience. As such, further enhancement of the gaming experience is limited by these graphically based avatars as they are unable to realistically show real-time emotional states of players within the gaming environment. Thus, what is needed is a technique for enhancing the gaming experience through more realistic representations of a player in a gaming environment.

DISCLOSURE OF THE INVENTION

A method and system for real-time rendering within a gaming environment. Specifically, one embodiment of the present invention discloses a method of rendering a local participant within an interactive gaming environment. The method begins by capturing a plurality of real-time video streams of a local participant from a plurality of camera viewpoints. From the plurality of video streams, a new view synthesis technique is applied to generate a rendering of the local participant. The rendering is generated from a perspective of a remote participant located remotely in the gaming environment. The rendering is then sent to the remote participant for viewing.

Another embodiment of the present invention discloses a system for image rendering of a local participant within a gaming environment. The system implements the previously described method for real-time rendering. The system comprises a plurality of video cameras for recording real-time video streams of the local participant. The plurality of video cameras are located to provide multiple sample viewpoints surrounding the local participant. The system also comprises a new view synthesis module for generating a rendering of

BRIEF DESCRIPTION OF THE DRAWINGS

FIG. 3B is a flow diagram illustrating steps in a computer implemented method for implementing real-time video communication that allows for navigation by participants within a gaming environment, in accordance with one embodiment of the present invention.

BEST MODES FOR CARRYING OUT THE INVENTION

Figure 1:
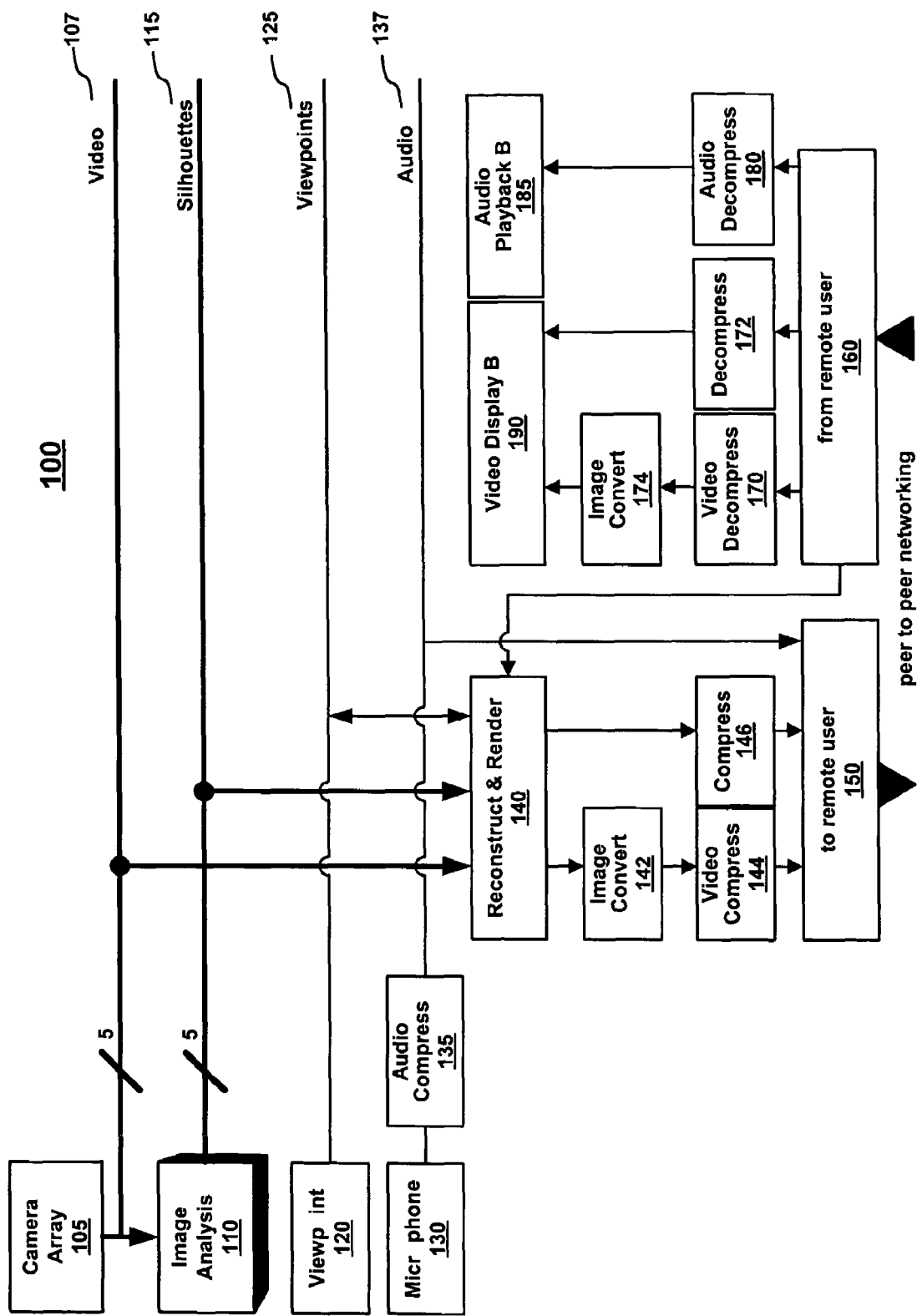
FIG. 1 is a schematic block diagram of an exemplary system at a local node for implementing a method of real-time rendering of a local participant within a gaming environment, in accordance with one embodiment of the present invention.

Reference will now be made in detail to the preferred embodiments of the present invention, a method and system of real-time rendering of a participant within a gaming environment using new-view synthesis techniques. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, game console, set-top box, mobile phone, and the like. This software program is operable for providing real-time image rendering for video and audio communication within a gaming environment. In one embodiment, the computer system includes a processor coupled to a bus and memory storage coupled to the bus. The memory storage can be volatile or non-volatile and can include removable storage media. The computer can also include a display, provision for data input and output, etc.

Accordingly, embodiments of the present invention provide a method and system for generating real-time renderings of a local participant using new view synthesis techniques to enable video communication in a gaming environment. Further enhancement of the gaming experience is possible through photo-realistic renderings of a participant that are incorporated within a graphically based avatar that represents the participant within a gaming environment. That is, the head and facial features of the local participant are joined with a graphically generated geometric body within the gaming environment. As such, the present invention is capable of enhancing the gaming experience through more realistic representations of participants by realistically showing real-time emotional states of participants in the gaming environment.

In various embodiments of the present invention, the gaming environment comprises any fantasy environment within which a participant is able to interact and manipulate, such as, a role playing game (RPG). The gaming environment supports single and multiple participant formats. In addition, the gaming environment is created within a single computer system supporting a single participant or a network of computer systems supporting multiple participants. For RPGs that support multiple players, the players can be coupled together through any network. For example, players can be coupled together through a geographically limited local area network (LAN), or a network that has a wider geographic scope, such as on-line gaming over the Internet. As such, on-line gaming provides for a gaming environment that can encompass a few players, or millions of players. While embodiments of the present invention are described within the context of a gaming environment, other embodiments are well suited to other environments that provide for interaction between multiple participants that are outside the context of gaming.

A discussion of a method and system for real-time renderings of a local participant using new-view synthesis techniques to enable video communication in a video conferencing environment is presented in the following co-pending U.S. patent application assigned to the present assignee: Ser. No. 10/176,494, entitled "METHOD AND SYSTEM FOR REAL-TIME VIDEO COMMUNICATIN WITHIN A VIRTUAL ENVIRONMENT," by Malzbender et al., the disclosure of which is hereby incorporated herein by reference.

FIG. 1 is a block diagram illustrating a system 100 capable of generating real-time renderings of a local participant using new-view synthesis techniques to enable video and audio communication within a gaming environment, in accordance with one embodiment of the preset invention. In one embodiment, system 100 is located at a local node, also referred to as a portal, that provides access for a local participant into the gaming environment. More particularly, each of the participants within the gaming environment can be associated with a system 100 for generating output audio and video image streams for communication within the gaming environment.

In another embodiment, elements of system 100 are located at varying locations that support participants within a gaming environment. For example, a central server computer that services and supports the gaming environment comprises elements of system 100, in one embodiment. In this way, more of the processing load is spread among more computing resources coupled together through a communication network.

The system 100 renders gaming participants as characters or graphically based avatars within a gaming environment, in accordance with one embodiment of the present invention. The system 100 provides a graphical user interface to the gaming environment. As such, participants are capable of looking around the gaming environment and move within the shared gaming environment, while other participants are able to observe in real-time those movements.

The gaming environment creates a fantasy world or environment within which participant interaction is possible. For example, these gaming environments are also referred to as role playing games (RPG). The participant can select many roles within which to exist in the gaming environment. For example, within one RPG, the participant may decide his or her avatar to be a knight, a peasant, a sorceress, or any number of male and female characters.

The system 100 is a streaming media application, and has media flowing through a staged dataflow structure as it is processed, as is shown in FIG. 1. As will be discussed more fully below, the system 100, in one embodiment, depicts a simplified processing pipeline for the generation of real-time image renderings of a local participant in four stages: image acquisition, 2D image analysis, reconstruction and rendering, and display. First, cameras each simultaneously acquire an image. Second, 2D image analysis identifies the foreground of the scene and produces silhouette contours. Third, an image based visual hull (IBVH) technique constructs a shape representation from the contours and renders a new viewpoint of the image. Fourth, a rendered image is displayed.

While the present embodiment discloses generating image based renderings of a local participant within a gaming environment, other embodiments are well suited to using new-view synthesis techniques to generate three dimensional geometric models of the a local participant. The three dimensional model is generated from a plurality of video image streams, from which renderings of the local participant are created.

System 100 in FIG. 1 includes a camera array 105 comprising a plurality of camera acquisition modules. The camera array 105 is used for simultaneously acquiring an image, such as, the local participant. In one embodiment, the camera acquisition modules are digital recording video cameras.

Figure 2A:
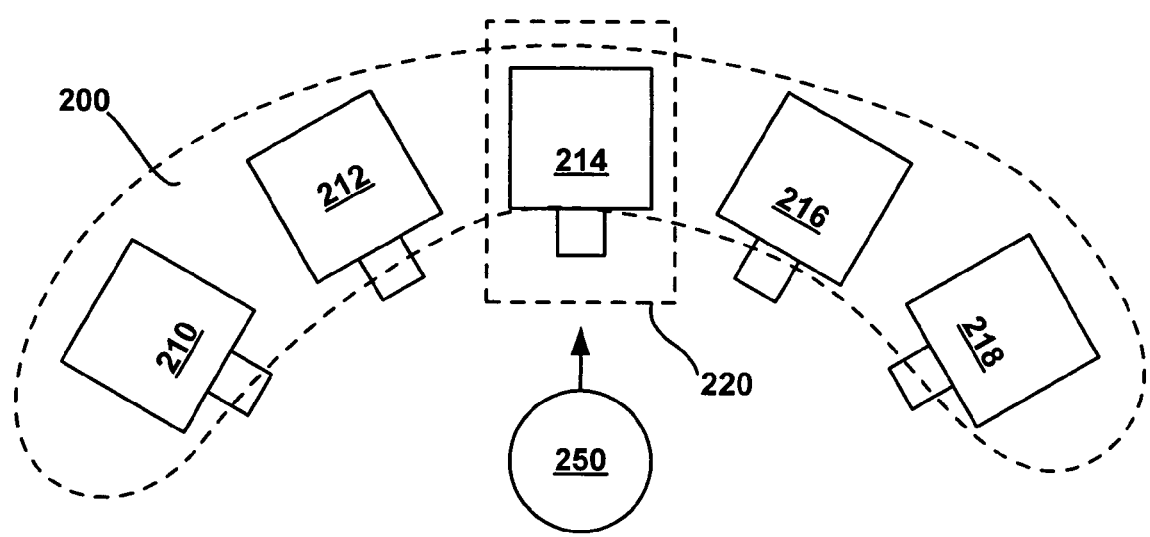
FIG. 2A is a block diagram of a cross-sectional top view of a desktop immersive gaming system at a local node for capturing video streams that are real-time of a local participant, in accordance with one embodiment of the present invention.
Figure 2B:
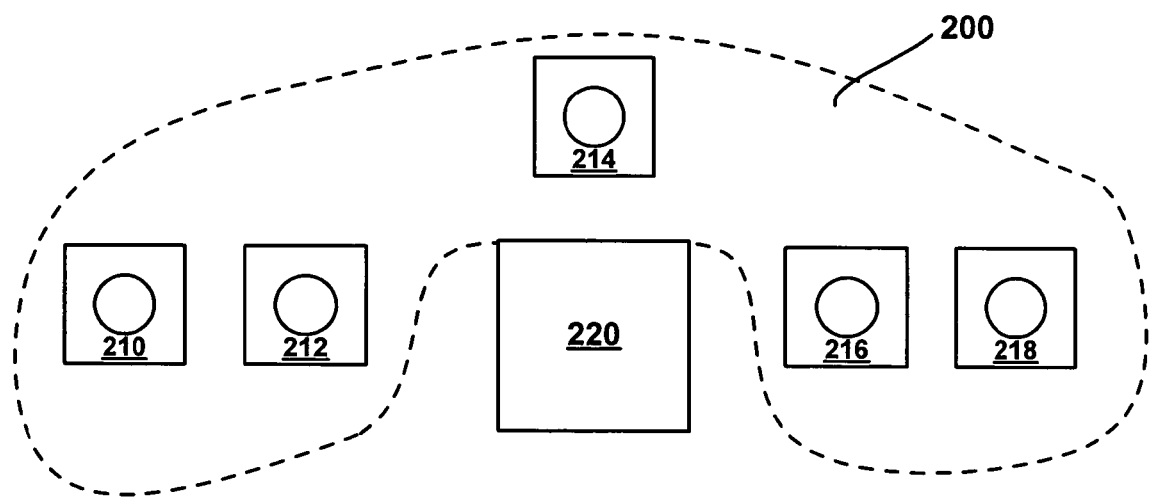
FIG. 2B is a block diagram of a cross-sectional front view of the desktop immersive gaming system of FIG. 2A for capturing video streams that are real-time of a local participant, in accordance with one embodiment of the present invention.

Referring now to FIGS. 2A and 2B, the camera array 105 is represented by a block diagram of a unit 200 comprising a plurality of camera acquisition modules that surround a participant 250 that can be implemented within system 100, in accordance with one embodiment of the present invention. Referring to FIG. 2A, a cross-sectional view from the top of unit 200 is shown, in accordance with one embodiment of the present invention. In the present embodiment, the unit 200 consisting of five separate cameras (camera acquisition module 210, 212, 214, 216, and 218) is placed on top of a conventional personal computer (PC) display 220 associated with the participant 250. Although five separate cameras are used in the present embodiment, it is possible to increase or decrease the number of cameras depending on image quality and system cost. Increasing the number of cameras increases the image quality. In addition, varying forms of system 200 are implemented. For example, a lesser powerful version of system 100 with one or more cameras are implemented to generate plain two dimensional video streams, or fully synthetic avatars.

The five camera acquisition modules 210, 212, 214, 216, and 218 all face and wrap around the participant 250. The participant 250 faces the five camera acquisition modules. In addition, the unit 200 produces five video streams in real-time from multiple perspectives via the five camera acquisition modules 210, 212, 214, 216, and 218. From these multiple video streams, new view synthesis methods can be implemented to generate new views of the participant from arbitrary perspectives rendered from locations of other observing participants with respect to a location of the local participant within a coordinate space of the gaming environment. Generation of the new views can occur in real-time to provide for real-time audio and video communication within the gaming environment.

FIG. 2B is a cross-sectional front view illustrating the unit 200 of FIG. 2A comprising the plurality of camera acquisition modules 210, 212, 214, 216, and 218. As shown, the unit 200 can be a single unit that is attached directly to the display 220. Other embodiments are well suited to camera acquisition modules that are not contained within a single unit but still surround the participant 250, and to camera acquisition modules that are not attached directly to the display 220, such as placement throughout a media room to capture larger and more complete images of the participant. The placement of camera acquisition module 214 is higher than the remaining camera acquisition modules 210, 212, 216, and 218, in the present embodiment; however, other embodiments are well suited to placement of the camera acquisition modules on a singular horizontal plane, for arbitrary placement of the camera acquisition modules, and/or for non-uniform displacement of the camera acquisition modules.

Returning back to FIG. 1, system 100 also contains an image analysis module 110. The image analysis module 110 module segments or separates out the local participant from each of the real-time video streams coming out of the camera acquisition modules in the camera array 105. The local participant in the foreground is separated from the physical background in each of the real-time video streams. In this way, the local participant is segmented out from his background in the physical world.

In order to segment the foreground from the physical background, the system 100 goes through a calibration stage prior to operation, in accordance with one embodiment of the present invention. Initially, the first stage of operation is camera calibration. This operation allows the extraction of lens distortion for removing image artifacts, color transforms to enable color-consistent combination of data from the multiple cameras to produce a single display image, and both intrinsic and extrinsic camera parameters for each of the camera acquisition modules in the camera array 105. Intrinsic parameters are internal to each camera and include a quantification of the lens distortion parameters, focal length, field of view, aspect ratio, center of projection, and color sensitivity. Extrinsic parameters include the camera pose, which is the orientation and position of each camera acquisition module in relation to the local participant (e.g. participant 250 in FIG. 2A).

In one embodiment, a single uncalibrated target is used for obtaining all of the each face (24 colors plus black and white). Linear features (sides of squares) provide observations for determining lens distortion, while the shapes of squares themselves provide for estimating the intrinsic parameters. The colors on each of the squares allow each face to be identified and oriented, so the observed colors can be used to determine each camera's color transform, and the corners provide image coordinate observations for determining extrinsic parameters. Waving the target around before the camera array 105 is sufficient for obtaining the needed parameters.

Next, multiple images are collected without a foreground participant present to build a background model for each pixel in each camera, in one embodiment. In another embodiment, the background model is built from multiple images that comprise both the background and the foreground participant. This data may be stored in module 130 for purposes of contour extraction. The model is a statistical characterization that specifies what the mean and standard deviations for each color channel are at each sensor element when viewing the background. This allows for the segmentation of the user from the background in each of the camera views. Other background models can easily be implemented, such as, multimodal representations of color statistics, and mixtures of Gaussian distribution functions.

In one embodiment, the separation of the local participant in the foreground and the background is accomplished at the pixel level. The image analysis module 110 is capable of distinguishing the pixels of the local participant from those of the background. Foreground pixels are distinguished from background pixels through a procedure that begins with establishing a background model. This background model is acquired with no local participants being viewed by the camera array 105. Color means and variances are computed at each pixel. This permits the image analysis module 110 to make a decision on whether a pixel color currently viewed is sufficiently different from its associated pixel color that is established in the background model to be considered as part of the foreground.

Within the video streams, contour silhouettes 115 of the local participant are generated when the foreground is extracted from the images captured by the camera array 105. The contour silhouettes 115 are generated by comparing the input images with the predetermined background model. In one embodiment, foreground silhouettes are created by differencing the input images and background models.

More specifically, the image analysis module 105 acquires the raw Bayer mosaic, in one embodiment of the present invention. The camera acquisition modules in the camera array 105 acquire color information with even scan lines of alternating red and green pixels followed by odd scan lines of alternating green and blue pixels (termed the Bayer mosaic). Then the camera converts the Bayer mosaic into color pixels using the YUV422 format.

In addition, the image analysis module 105 employs a contour extraction module. The contour extraction module is capable in one pass to determine the major foreground objects in an image. Luminance changes are accommodated to determine both shadows and gradual light level fluctuations. The contour extraction module implements an adjustable sampling of the image to find the subject (local participant) rapidly while creating access to the high quality texture of the underlying imagery. As such, the image foreground contours are detected at reduced resolution by adjusting the sampling step. This allows greater image throughput without the loss of image information that accompanies the use of a reduced resolution data source. In addition, in another embodiment, the contour extraction module is able to effectively extract the foreground by using piecewise linear approximations.

In system 100, a viewpoint module 120 determines the viewpoints 125 or perspectives of observing participants when viewing a local participant. The viewpoint module 120 receives position information from each of the observing participants, e.g. from block 160 via the reconstruction and render module 140. The participants of the shared gaming environment are positioned in a coordinate space of the gaming environment. As such, by vector analysis based on the relative positioning of the observing participants in relation to the local participant, the viewpoints 125 are determined. Thereafter, rendered views of a local participant are generated depending on the viewpoints 125 of the observing participants within the gaming environment.

The system 100 also comprises a microphone 130 that is in general, an audio acquisition module, in one embodiment of the present invention. The microphone 130 receives audio input in real-time of the local participant. The audio input is compressed in the audio compression module 135, and can be combined with the video streams generated from the viewpoints 125 of the observing participants to generate photo-realistic renderings of the local participant for real-time audio and video interaction within the gaming environment.

Continuing with FIG. 1, the system 100 also comprises a reconstruct and render module 140, in accordance with one embodiment of the present invention. The reconstruction and render module uses new view synthesis techniques to generate renderings of the local participant from the perspective of an observing participant. As stated previously, the new view synthesis technique is performed to create image based renderings of the local participant in one embodiment. In another embodiment, the new view synthesis technique is performed to create renderings of the local participant from three dimensional geometric models. Thereafter, the renderings can be virtually placed into a synthetic rendering of the gaming environment for communicative interaction with other observing participants.

For each observing participant, their perspective is associated with a direction from the local participant to the respective observing participant within a coordinate space of the gaming environment. The direction is rendered from a location of the observing participant with respect to a location of the local participant within the coordinate space. A new view of the local participant is generated for each of the observing participants. The new views of the local participant are generated in real-time. For example, if there are m observing participants, m new views of the local participant are generated, one from each of the perspectives of the m observing participants.

Construction of each of the m new views is done with various new view synthesis techniques. The new view synthesis techniques reconstruct, from the plurality of real-time video streams of the local participant taken from the multiple sample perspectives, a new view taken from a new and arbitrary perspective, such as, the perspective of an observing participant in the gaming environment. The new view of the local participant is then rendered from the reconstruction. The new view of the local participant is able to portray periods of eye-to-eye contact by the local participant to the observing participant. In other words, the new view that is generated is able to portray an eye contact view of the local participant, that is displayed on a display to the observing participant, during periods when the local participant is directly viewing an character representing the observing participant within the gaming environment. Similarly, the character image of the observing participant is obtained by the local participant from the observing participant.

As stated previously, in one embodiment, an intermediate step includes rendering a three dimensional model of the local participant from the perspective of the observing participant, from which the new view of the local participant is generated. The three-dimensional model is generated from the various real-time video streams of the local participant. The new view is rendered for blending within a synthetic rendering of the three dimensional gaming environment.

In other embodiments, the reconstruct and render module 140 uses an image based visual hull (IBVH) technique to render the three dimensional model of the local participant from the perspective of an observing participant. The IBVH technique back projects the contour silhouettes into a three-dimensional space and computes the intersection of the resulting frusta. The intersection, the visual hull, approximates the geometry of the user. Rendering this geometry with view-dependent texture mapping creates convincing new views.

In other embodiments, other reconstruction techniques instead of IBVH and image-based polygonal reconstruction techniques are used to render a three dimensional model of the local participant from the perspective of an observing participant.

In one embodiment, the three dimensional model of the local participant is rendered within the gaming environment without further modification. However, in another embodiment, less bandwidth is required when viewpoints of a local participant are rendered and a two-dimensional video stream along with alpha maps are created to generate a three dimensional model of the local participant that is rendered within the gaming environment. The alpha maps specify which parts of the two-dimensional model are transparent so that the background shows through.

The system 100 also comprises an image convert module 142. The image convert module 142 translates the red, green and blue (RGB) color format of the camera acquisition modules in the camera array 105 into the YUV format.

By converting to the YUV format, the video compress module 144 can select from various compression formats in order to send the two-dimensional video image of the local participant to an observing participant. While any number of compression formats are applicable, in one embodiment, the compression format selected is the Moving Pictures Expert Group MPEG4 standard.

In addition, a compression module 146 is used to compress the alpha map data generated from the reconstruct and render module 140. The alpha maps do not contain any color coding, therefore, no conversion to the YUV format is needed. As such, the alpha maps are sent directly to the compression module 146 for compressing the alpha maps into any suitable format more readily transmittable through a network. Thereafter, the compressed data from the video compress module 144 and the compression module 146 are sent to the remote user via module 150. From module 150, the video and audio streams are sent directly to the corresponding observing participants over a peer-to-peer communication connection, in one embodiment. The peer-to-peer communication minimizes the amount of processing on the audio/video data to ensure real-time interaction.

In addition, in one embodiment, system 100 also comprises a gaming environment user interface module (not shown). The interface provides for local participant, as well as other observing participant, interaction within the gaming environment. As such, each participant can control their position within the gaming environment of an associated avatar that represents that participant.

Embodiments of the present invention are well suited to locating the components of system 100 at varying locations within a network, wherein the network comprises a plurality of participants participating within a gaming environment. In one embodiment, the components of system 100 are located within resources available to a local participant at a local site. In other embodiments, the components of system 100 are located within resources available to the local participant at a remote site, such as, an observing participant. For example, generation of the rendered new view of the local participant is accomplished on the receiver side (at an observing participant) rather than the sender side (local participant). In addition, in still another embodiment, the reconstruction and rendering is performed at a remote location independent of both the sender (local participant) and the receiver (observing participant), such as, a remote server.

Although the present embodiment uses the mouse or the cursor keys to move the local participant throughout the gaming environment, other input modalities can be used as well. For example, the user interface module can be used to effect movement of the avatar representing the local participant within the gaming environment. Also, the user interface module can be used to rotate the avatar representing the local participant about a vertical axis in the gaming environment. This defines an orientation of the avatar representing the local participant within a coordinate system of the gaming environment. This allows the local participant to get various views of a viewpoint encompassing 360 degrees at a particular location within the gaming environment.

Other embodiments are well suited to movement of the avatar representing the local participant as directed by eye gaze. Moreover, commands are implemented and issued through eye gaze, in one embodiment. For example, in one exemplary implementation, an object (e.g., a weapon) is picked up by the avatar by directing the gaze of the avatar upon the object.

In one embodiment of the present invention, each of the participants within a gaming environment is generating views of themselves using system 100 and sending these views to the other participants within the gaming session. In this way, real-time video and audio communication are enabled between the participants of a gaming environment. For example module 160 at the local participant receives the input audio streams and corresponding input video image streams associated with the observing participants that are communicating with the local participant within the gaming environment. The input audio streams and corresponding input video image streams are sent from the observing participants. In other embodiments, participants generate views of themselves using a single camera systems that portrays participants in two dimensions from a single viewpoint. In still other embodiments, participants generate views of themselves using varying numbers of cameras (e.g., within the system 100).

Separate audio streams and corresponding input video image streams are generated from each of the observing participants from the perspective of the local participant within the gaming environment, and is associated with a direction taken from the local participant towards the respective observing participant within the coordinate space of the gaming environment.

As an illustration, FIG. 1 provides for video and audio signals received as inputs into block 160 by the local participant. The video and audio input signals are received from an observing participant by the local participant utilizing system 100. In one embodiment, the video and audio input signals are created using a system comprising the same elements as system 100 to generate audio and video streams of the remote participant from the viewpoint of the local participant in the three dimensional gaming environment.

The video input from the remote participant is comprised of a two-dimensional video input stream and an alpha map, as previously described in full. The video input stream of the remote participant comprises a two-dimensional model of the remote participant from the perspective of the local participant within the three dimensional gaming environment. The two-dimensional video input stream from the remote participant is combined with alpha mask data to render a seemingly three dimensional model of the remote participant within the gaming environment. While the resulting actual video stream of the model is still two-dimensional, the model appears to be a three-dimensional model since the model is updated as a viewer moves around within the three dimensional gaming environment.

The two-dimensional video input stream is sent to the video decompression module 170 for decompression. Similarly, the alpha maps from the remote participant are sent to the decompression module 172 for decompression. Previously, the video input stream and the alpha maps data from the remote participant were compressed in a format, such as, MPEG4, to facilitate the transfer of data through a network.

The two-dimensional video input stream utilizes YUV color scheme. For display, the image convert module 174 reverses the operation of the image convert module 142. As such, from the decompressed two-dimensional video input stream, the image convert module 174 converts the YUV data to RGB data for display.

In the video display 190, the decompressed two-dimensional video input stream in RGB color format is combined with the alpha maps to generate a seemingly three dimensional model of the remote participant viewed from the perspective of the local participant within the three dimensional gaming environment. The three dimensional model of the remote participant is blended with a synthetic rendering of the three dimensional gaming environment for display at the video display module 190.

The display 190 is coupled to the user interface for viewing the gaming environment from the perspective of the local participant. Depending on the orientation of the local participant, each of the video streams from the observing participants can be viewed on the display 190. Due to limited field of view of the display 190, warpings and deformation of the virtual space as shown on the display 190 will allow wider views of the gaming environment, in one embodiment. Although this may introduce geometric inconsistencies between the gaming world and the physical display, photo-realistic images of the participants are still readily available, such as eye to eye contact within that distorted space.

In addition, the audio stream from the remote participant is compressed. As such, the audio stream is received by the local participant at the audio decompression module 180 to decompress the audio stream. After decompression, the audio is broadcast via a local speaker by the audio playback module 185.

The modules used for receiving data from the plurality of observing participants (e.g., modules 160, 170, 172, 174, 180, 185, and 190) comprise an interface module, in accordance with one embodiment of the present invention. The interface module incorporates the plurality of input video image streams that comprise real-time photo-realistic features of the plurality of observing participants into a plurality of graphically generated avatars. The plurality of graphically generated avatars represent the plurality of observing participants. The interface module also blends the plurality of graphically generated avatars within a synthetic rendering of the three dimensional gaming environment as viewed by the local participant.

Figure 3A:
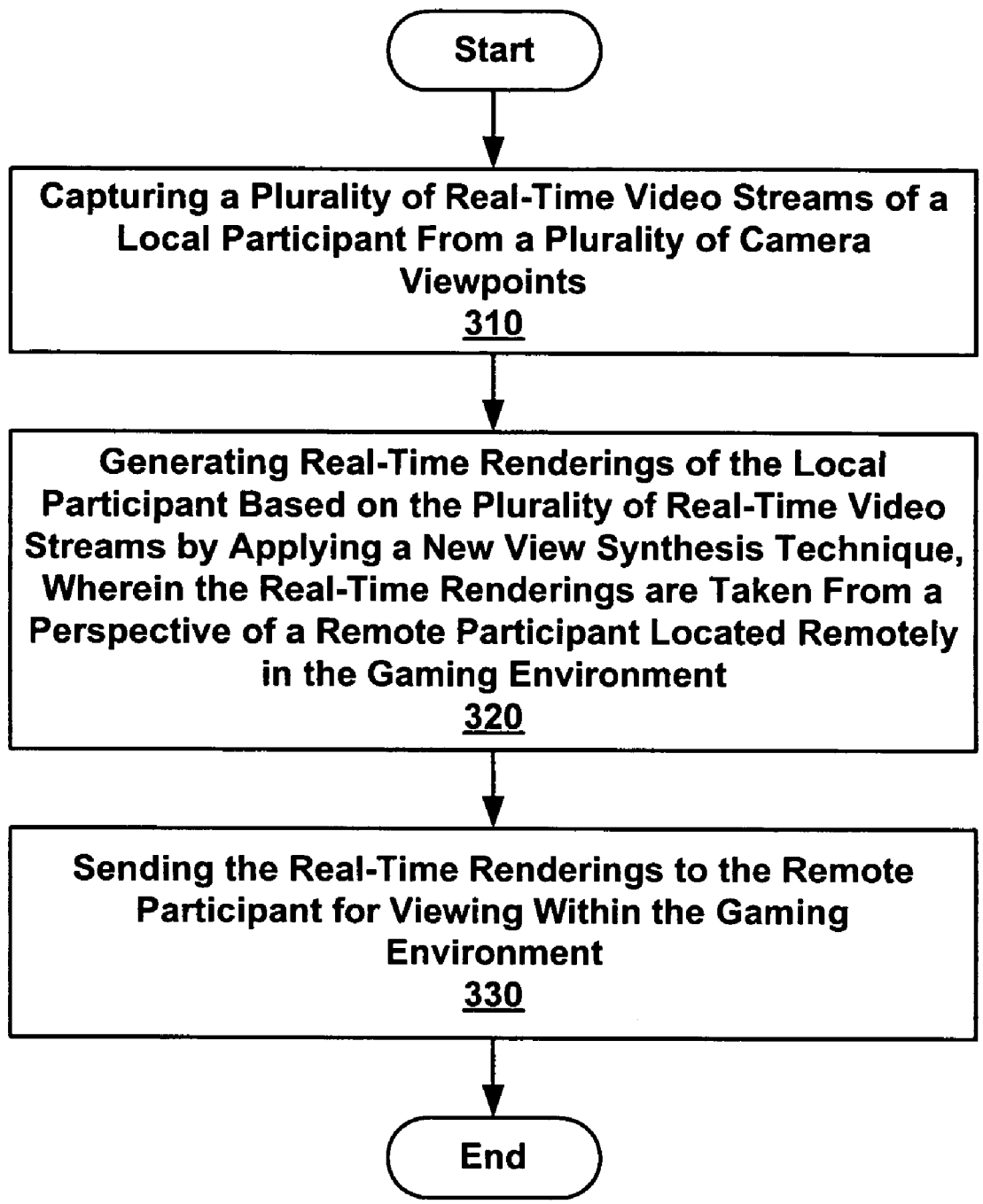
FIG. 3A is a flow diagram illustrating steps in a computer implemented method for implementing real-time video communication between two participants within a gaming environment, in accordance with one embodiment of the present invention.

Referring now to FIG. 3A, a flow chart 300A is described illustrating steps in a computer implemented method for real time rendering of a local participant in a gaming environment to create an interactive gaming experience between two participants, in accordance with one embodiment of the present invention. In the present embodiment, a communication session, or gaming session, is conducted between a local participant and a second participant. Although the present embodiment is implemented in association with a three dimensional gaming environment, other embodiments are well suited for implementations within a two-dimensional gaming environment.

At 310, the present embodiment begins by capturing a plurality of real-time video streams of a local participant from a plurality of camera viewpoints. The plurality of real-time video streams are taken from a plurality of camera viewpoints partly surrounding the local participant. For example, the plurality of real-time video streams can be captured from the various camera acquisition modules in the camera array 105 of FIG. 1.

At 320, the present embodiment proceeds by generating real-time renderings of the local participant. The renderings are generated from the plurality of real-time video streams by applying a new view synthesis technique. The real-time renderings are generated from a perspective of a remote participant that is located remotely in the gaming environment. As such, the real-time renderings are generated taken from a direction from the remote participant to the local participant and defines a viewing perspective of the remote participant of the local participant within the gaming environment.

A new view synthesis technique is applied to the plurality of real-time video streams to reconstruct and generate the real-time renderings of the local participant. In one embodiment, the new-view synthesis technique comprises an image-based visual hull technique, as previously described in full. In another embodiment, the real-time renderings are generated from three dimensional geometric models derived from the plurality of real-time video streams.

The real-time renderings comprise real-time photo-realistic images of the local participant. In one embodiment, the real-time renderings can portray an eye contact view of the local participant to the remote participant when the local participant is directly viewing an image of the remote participant. In another embodiment, the video image stream can portray real-time expression of the local participant. In still another embodiment, the video image stream is capable of monitoring and portraying gaze of the local participant. In still other embodiments, the real-time renderings portray the torso of the local participant, while other embodiments portray full body views of the local participant.

At 330, the present embodiment sends the real-time renderings to the remote participant. As such, the remote participant is able to view the real-time renderings of the local participant within the three dimensional gaming environment.

In addition, in another embodiment, the real-time renderings are incorporated into a graphically generated avatar. That is, the real-time renderings including the head and facial features of the local participant, for example, are joined with a graphically generated geometric body within the gaming environment, in one embodiment. As such, the graphically generated avatar represents the local participant in the gaming environment.

As used within some embodiments of the present invention, the graphically generated avatar is a geometrically based avatar that is synthetic, such as, representative portions of the local participant (e.g., chest and legs). In other embodiments, the reconstructed and rendered video image stream is not incorporated into a graphically generated avatar, and fully represents the local participant within the gaming environment.

In still other embodiments of the present invention, further processing of the real-time renderings is performed to generate facilitate non-photorealistic transformation or artistic and non-photorealistic cartoon rendering. In this way, the real-time renderings of the local participant that comprises real-time photo-realistic features is transformed into a cartoon like features that is based, with varying degrees of reality, on the local participant. These cartoon like features can then be incorporated into a graphically based avatar if desired.

In one embodiment, the real-time renderings portray eye contact views of the local participant to the remote participant when the local participant is directly viewing an image of the remote participant. In another embodiment, the real-time renderings portray real-time expressions of the local participant. In still another embodiment, the real time rendering is capable of monitoring and portraying gaze of the local participant within the three dimensional gaming environment. In still further embodiments, the real-time renderings represents fully the local participant within the gaming environment and is not incorporated within a graphically generated avatar. Thus, the present embodiment is capable of personifying the real-time renderings to reflect the real emotions and expressions of the local participant.

FIG. 3B is a flow chart 300B that illustrates steps in a computer implemented method for generating real-time renderings of a local participant in a gaming environment that is capable of navigation between participants, in accordance with one embodiment of the present invention. The flow chart 300B continues from 330 of FIG. 3A. In one embodiment, the method as disclosed in flow chart 300B is repeated for every generated frame of video of the local participant.

At 340, the present embodiment generates the real-time renderings from a perspective taken from a second location of the remote participant with respect to a first location of the local participant. The real-time renderings are generated within a coordinate space of the gaming environment.

At 350, the present embodiment enables a change in the locations of the local and remote participants. In one embodiment, the local and remote participants are free to navigate around in the coordinate space of the gaming environment. Navigation by either the local or remote participant will affect the perspective of the remote participant when viewing the local participant. The perspective corresponds to the changed locations of the local and remote participant in the gaming environment.

At 360, the present embodiment proceeds by modifying the real-time renderings to reflect the change in locations of the local and remote participants. As such, the remote participant receives a real-time view of the gaming environment that reflects movement by either the local participant or the remote participant. This is analogous to motion in the real physical world.

Figure 3C:
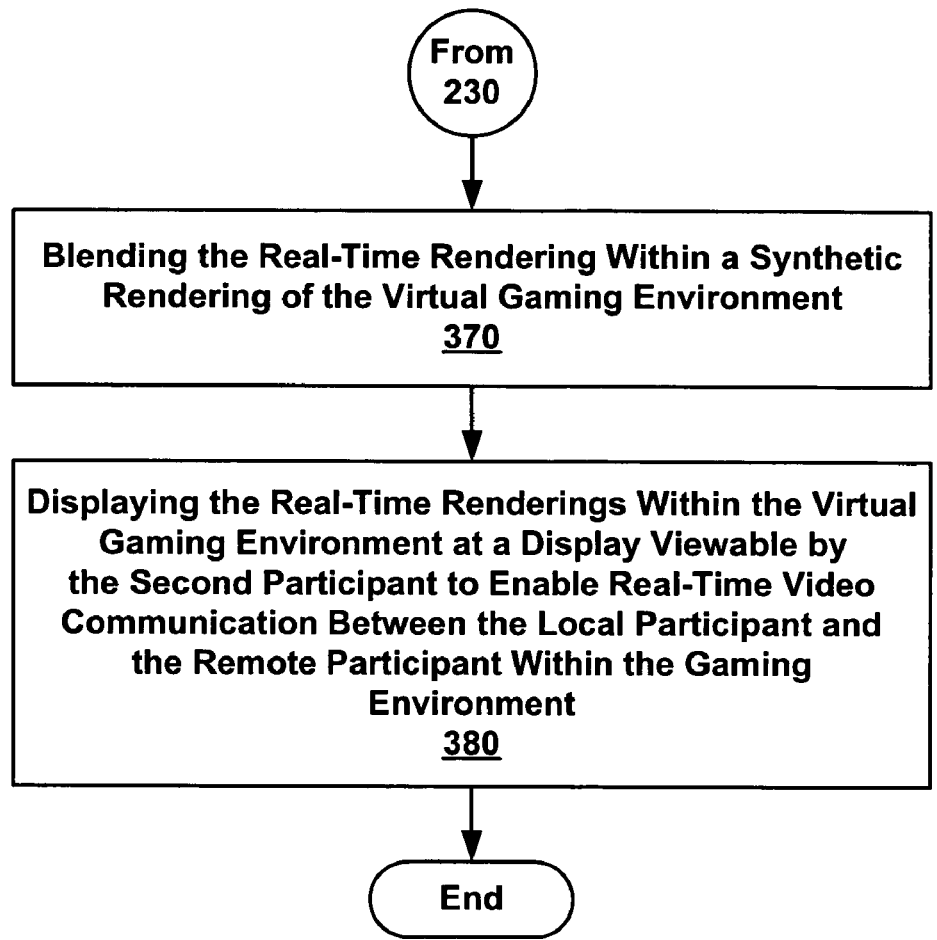
FIG. 3C is a flow diagram illustrating steps in a computer implemented method for implementing real-time video communication that blends and displays photo-realistic computer generated avatars within a gaming environment.

FIG. 3C is a flow chart 300C that illustrates steps in a computer implemented method for generating real-time renderings of a local participant in a gaming environment that establishes video communication between participants, in accordance with one embodiment of the present invention. The flow chart 300C continues from 330 of FIG. 3A.

In the present embodiment the real-time renderings are blended within a synthetic rendering of the three dimensional gaming environment. That is, the real-time renderings of the local participant are blended within a background to provide for photo-realistic versions of the local participant within the gaming environment. The real-time renderings comprise photo-realistic features of the local participant. As such, the real-time renderings portray the real-time expressions and emotions of the local participant through the facial features.

In another embodiment, as previously stated, the real-time renderings are incorporated into a graphically generated avatar. As such, the graphically generated avatar is then blended within a synthetic rendering of the three dimensional gaming environment. That is, the graphically generated avatar is blended within a background to provide for photo-realistic versions of the local participant within the gaming environment. The graphically generated avatar previously incorporated the photo-realistic features of the local participant. In one embodiment, the photo-realistic features comprise facial features of the local participant that are incorporated into within a shell of an avatar. As such, the graphically generated avatar portrays the real-time expressions and emotions of the local participant through the facial features.

At 380, the present embodiment enables real-time video communication between the local participant and the remote participant within the gaming environment by displaying the real-time renderings, or graphically generated avatar, at a display viewable by the remote participant. The real-time renderings portray the photo-realistic features of the local participant within the gaming environment. As a result, the remote participant views real-time photo-realistic features (e.g., facial features) of the local participant while both the local participant and the remote participant are experiencing the three dimensional gaming environment. This promotes interactive gaming between the local participant and the remote participant within the gaming environment.

To further promote the interactive gaming experience, in another embodiment, a real-time audio stream is captured of the local participant to enable real-time audio communication in the gaming environment. As such, the real-time renderings and the real-time audio stream are sent to the remote participant for communicative purposes to enable real-time video and audio gaming communication from the local participant to the remote participant.

In addition, the local participant interacts with an input real-time rendering of the remote participant within the gaming environment as shown on a display associated with the local participant, in accordance with one embodiment of the present invention. An input real-time rendering (e.g., an input video image stream) is received by the local participant that displays a second real-time renderings representing the remote participant within a synthetic rendering of the three dimensional gaming environment as viewed by the local participant. The real-time input video image stream of the remote participant is generated using the method as described in flow chart 300A of FIG. 3, in one embodiment. As such, the real-time renderings comprise photo-realistic images of the remote participant.

In another embodiment, the local participant generates a second real-time renderings of the local participant corresponding to a second perspective of another remotely located participant, a third participant, in the gaming environment. The second real-time renderings of said local participant is generated from the plurality of real-time video streams by again applying the new view synthesis technique.

Also, the second perspective is rendered from a location of the another remote participant with respect to a location of the local participant. The second perspective is directed from the another remote participant towards the local participant within the coordinate space of the gaming environment and defines a view of the local participant from the second perspective.

Further, in another embodiment, the second real-time renderings are blended within a synthetic rendering of the three dimensional gaming environment, that is the background, to provide for photo-realistic versions of the local participant within the gaming environment. This promotes interactive gaming between the local participant and the another remote participant within the gaming environment.

In addition, the local participant and the another remote participant can navigate through the gaming environment effecting a change in the second perspective. Correspondingly, the second real-time renderings are modified to reflect this change in the second perspective.

In one embodiment, the gaming environment supports a gaming session between a local participant and a remote participant (e.g., as described in the flow charts of FIGS. 3A-3C). Other embodiments are well suited to gaming sessions supporting more than two participants. In addition, in still other embodiments, the gaming environment supports multiple and independent gaming sessions occurring simultaneously.

Figure 4:
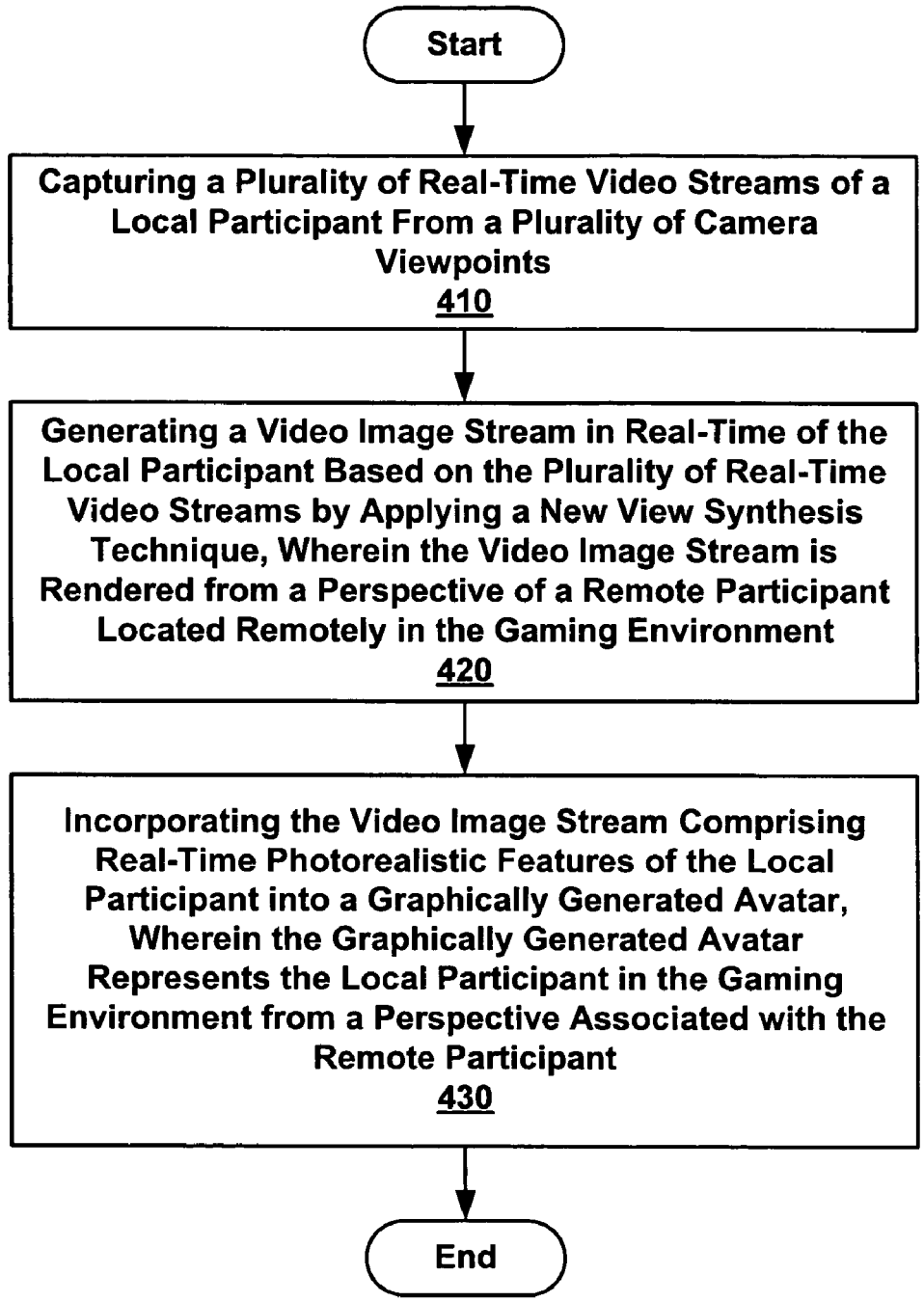
FIG. 4 is a flow diagram illustrating steps in a computer implemented method for implementing real-time video communication between multiple participants within a gaming environment, in accordance with one embodiment of the present invention.

Referring now to FIG. 4, a flow chart 400 is described illustrating steps in a computer implemented method for image-based rendering in a gaming environment to create an interactive gaming experience between participants, in accordance with one embodiment of the present invention. The present embodiment is implemented in association with a three-dimensional gaming environment; however, other embodiments are well suited to implementations within a two-dimensional gaming environment.

At 410, the present embodiment begins by capturing a plurality of real-time video streams of a local participant from a plurality of camera viewpoints. The plurality of real-time video streams are taken from a plurality of camera viewpoints partly surrounding the local participant. For example, the plurality of real-time video streams can be captured from the various camera acquisition modules in the camera array 105 of FIG. 1.

At 420, the present embodiment proceeds by generating a video image stream in real-time of the local participant. The video image stream is generated from the plurality of real-time video streams by applying a new view synthesis technique. The video stream is rendered from a perspective of a remote participant that is located remotely in the gaming environment. As such, the video image stream is rendered from a direction from the remote participant to the local participant and defines a viewing perspective of the remote participant of the local participant within the gaming environment.

A new view synthesis technique is applied to the plurality of real-time video streams to reconstruct and render the video image stream. In one embodiment, the new-view synthesis technique comprises an image-based visual hull technique, as previously described in full. The video image stream comprises real-time photo-realistic images of the local participant. In one embodiment, the video image stream can portray an eye contact view of the local participant to the second participant when the local participant is directly viewing an image of the second participant. In another embodiment, the video image stream can portray real-time expression of the local participant. In still another embodiment, the video image stream is capable of monitoring and portraying gaze of the local participant.

At 430, the present embodiment incorporates the video image stream into a graphically generated avatar. In other words, the video image stream that comprises real-time photo-realistic features of local participant is incorporated into the graphically generated avatar. That is, the video image stream including the head and facial features of the local participant is joined with a graphically generated geometric body within the gaming environment, in one embodiment. As such, the graphically generated avatar represents the local participant in the gaming environment.

As used within some embodiments of the present invention, the graphically generated avatar is a geometrically based avatar that is synthetic, such as, representative portions of the local participant (e.g., chest and legs). In other embodiments, the reconstructed and rendered video image stream is not incorporated into a graphically generated avatar, and fully represents the local participant within the gaming environment.

In still another embodiment, a plurality of real-time renderings is generated for multiple participants of a gaming session. These include the local participant, and a plurality of observing participants. Other embodiments are well suited to the generation of the plurality of real-time renderings that include participants that are not within a certain gaming session, but fall within other conditions, such as, approximate locality, line-of-sight, etc.

The positioning and orientation of each of the plurality of real-time renderings representing the plurality of observing participants within the coordinate space of the gaming environment is known to the local participant through position information. This position information is obtained from a central host that manages the gaming environment, or by peer to peer communication between each of the participants in the gaming session. As such, each of the real-time renderings is generated from a perspective taken from a direction associated with a location of one of the plurality of observing participants towards the location of the local participant. Thus, each of the plurality of real-time renderings defines a viewing perspective of the observing perspective when viewing the local participant within the gaming environment.

A new view synthesis technique is applied to the plurality of real-time renderings to reconstruct and render each of the plurality of video image streams. As a result, each of the real-time renderings comprises real-time photo-realistic images of the local participant as viewed from the various perspectives associated with the plurality of observing participants.

Moreover, the plurality of real-time renderings can be modified to account for navigation by the local and observing participants through a coordinate space of the gaming environment.

Correspondingly, an output audio stream in real-time is captured corresponding to the local participant. This output audio stream is transferred along with the plurality of real-time renderings to the plurality of observing participants. In this way, real-time audio and video communication is enabled between the local participant and the plurality of observing participants within the gaming session contained in the gaming environment.

In embodiments of the present invention, spatialized audio is incorporated to represent degrees of audio coupling between participants. In one embodiment, the degree of audio coupling is a function of the distance between two participants. Closer participants within the gaming environment have stronger audio coupling, just as in the real physical world. As such, private side conversations can be enabled just by moving closer in the gaming environment.

In addition, in another embodiment, private side conversations can be enabled if so specified by participants that is not a function of distance. In this case, eavesdropping participants outside of the selected side conversation would not be able to receive any audio streams from the participants in the side conversation no matter how close in proximity the eavesdropping participant is to the participants in the side conversation. As a result, in a single gaming environment, multiple side conversations can be taking place simultaneously and independently of each other within a gaming session.

To further promote the interactive experience, a plurality of input real-time renderings representing the plurality of observing participants is generated. Each of the plurality of input video image streams is taken from a perspective of the local participant. For example, an input video image stream is generated of an observing participant from the perspective of the local participant when viewing the observing participant.

In another embodiment, the input real-time renderings from the plurality of observing participants are incorporated within a second plurality of graphically generated avatars. The second plurality of graphically generated avatars represents the plurality of observing participants. As such, the plurality of observing participants are rendered by the second plurality of graphically generated avatars when blended with a synthetic rendering of the gaming environment. In one implementation, the second plurality of graphically generated avatars is shown at a display viewable by the local participant to promote the interactive experience between the local participant and the plurality of observing participants within the gaming environment.

In one embodiment, the local system 100 located at the local participant is coupled to a central host (not shown) comprising a server computer. The central host is responsible for gaming session management. The central host stores pertinent information regarding each of the gaming sessions supported by the gaming environment. The central host processes connections and disconnections for each of the gaming sessions. As such, participants are capable of joining existing gaming sessions or creating new gaming sessions within the gaming environment.

In the case where the local participant is joining an existing gaming session, the central host notifies each of the participants in the gaming session that there is a new participant. The new participant is initialized and from then on all participants of a gaming session are capable of notifying each other of any position updates in the gaming environment.

To avoid overhead on the central host server, communication between participants during a gaming session are peer to peer to facilitate real-time interaction within the gaming environment, in accordance with one embodiment of the present invention. When a new participant connects to a gaming session, the central host determines compatible media types between itself and all the participants. This is to ensure coordination of different media-type network transmissions.

Figure 5:
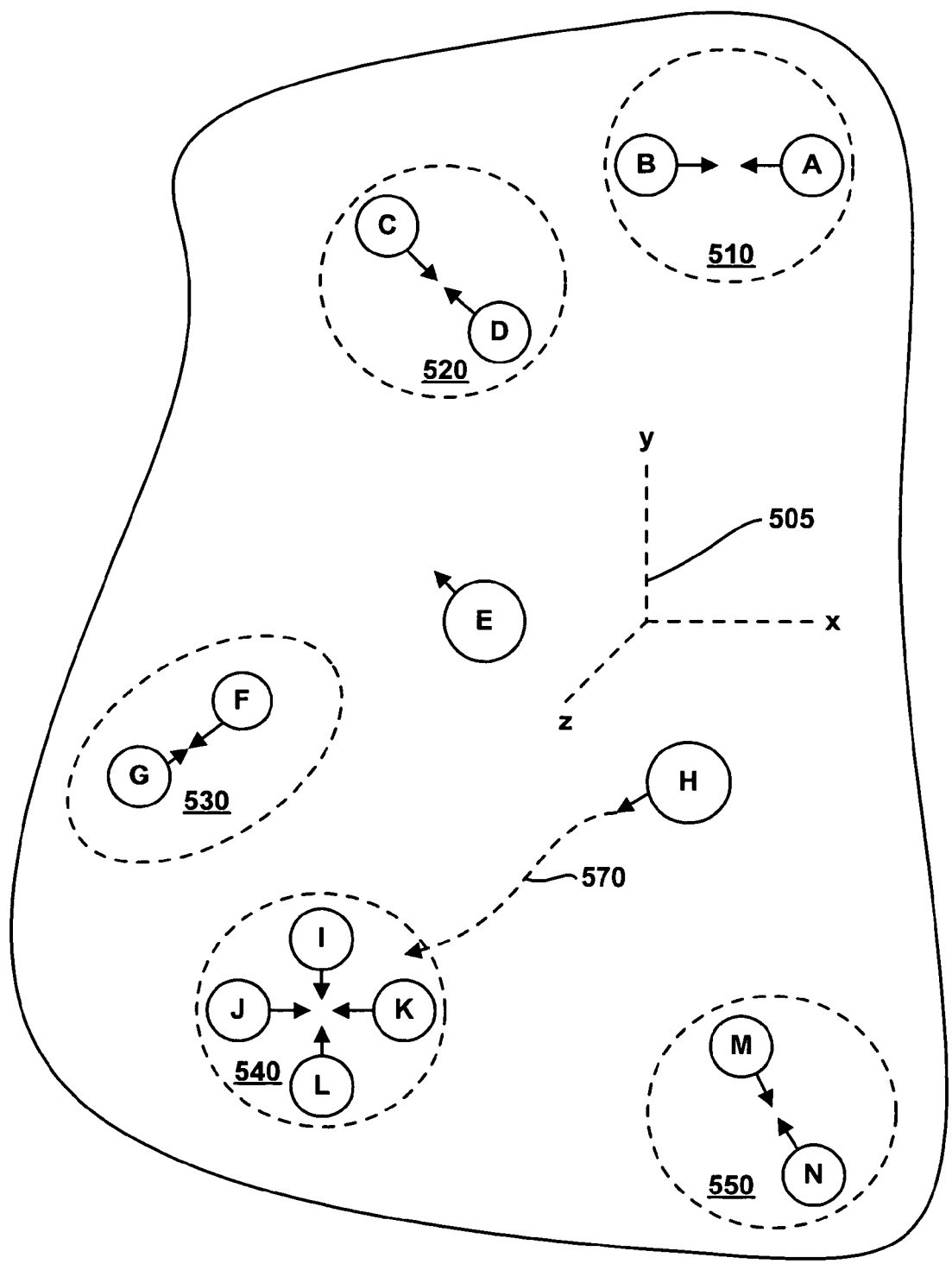
FIG. 5 is a diagram of a gaming environment illustrating multiple gaming sessions within the gaming environment that are simultaneous and independent of each other, in accordance with one embodiment of the present invention.

FIG. 5 is a diagram of a gaming environment 500 illustrating multiple gaming sessions that are conducted simultaneously and independently of each other, in accordance with one embodiment of the present invention. The gaming environment 500 can be any gaming environment, as described previously. Each of the participants in the gaming environment 500 are free to roam around a coordinate space 505 of the gaming environment 500, and interact with those participants within his/her local vicinity.

In another embodiment, participants can select remote participants in the virtual coordinate space 505 to enable private conversations without moving to a close physical location within the gaming environment 500.

The gaming environment 500 includes participants A-N. FIG. 5 illustrates the relative locations of each of the participants A-N within the coordinate space 505 of the gaming environment 500. The arrows pointing out from each of the circles, wherein the circles represent the participants A-N, illustrate the orientation of each of the participants A-N within the coordinate space 505 of the gaming environment 500.

Each of the participants A-N represented in the gaming environment 500 are located in independent and remote locations coupled together through a communication network, in accordance with one embodiment. In another embodiment, at least one of the participants A-N is an object, such as, a synthetic avatar.

Multiple gaming sessions 510, 520, 530, 540, and 550 are held simultaneously and independently of each other within the gaming environment 500, in one embodiment. Gaming session 510 includes participants A and B that are conducting real-time audio and video communication. Gaming session 520 includes participants C and D that are conducting real-time audio and video communication. Gaming session 530 includes participants F and G that are conducting real-time audio and video communication. Gaming session 540 includes participants I, J, K and L that are conducting real-time audio and video communication. Gaming session 550 includes participants M and N that are conducting real-time audio and video communication.

Participants E and H in the gaming environment 500 are not part of any gaming session that includes more than two participants. Participant E and H are experiencing the gaming environment in a solitary manner. However, FIG. 5 illustrates the navigation of participant H along path 570 towards a location that is within close proximity to the participants in the gaming session 540 to facilitate joining the gaming session 540.

In a gaming session with multiple observing participants (e.g., gaming session 540), a plurality of output video image streams corresponding to a plurality of perspectives associated with the observing participants is generated by a local participant, in accordance with one embodiment of the present invention. The plurality of observing participants are participating in a gaming session with the local participant within the gaming environment. Thereafter, a new view synthesis technique is applied to a plurality of real-time video streams captured at the local participant to reconstruct and generate each of the plurality of output video image streams.

By virtue of the coordinate space 505 in gaming environment 500, proper scaling of the plurality of output image streams of the local participant is preserved. As such, images of avatars representing the local participant can be scaled appropriately to reflect the relative distances between the local participant and each of the avatars representing the plurality of observing participants. For example, the video image streams of participant M from the perspectives of participants H and D will be appropriately scaled to reflect their distances away from participant M. As such, the image of participant M associated with the perspective of participant D will be smaller than the image of participant M associated with the perspective of participant H.

The local participant and the observing participants are free to navigate around in the gaming environment. Navigation by either the local participant, or any of the observing participants will change both the local perspective of the gaming environment and the positions of the observing participants within that local perspective. The perspectives are associated with directions associated with locations of each of the plurality of observing participants with respect to a location of the local participant. Navigation by the local participant will change its apparent location within the gaming environment as viewed by the other observing participants. Correspondingly, each of the perspectives of the observing participants of the gaming world will also change with navigation by those observing participants.

With changes in perspectives, the present embodiment proceeds by modifying corresponding output video image streams to reflect the changes in the plurality of inward perspectives. As such, the local participant has a real-time view of the gaming environment that reflects both movement by the local participant and movement by the observing participants within the gaming environment.

Real time visual and audio communication between the local participant and the plurality of observing participants within the shared gaming environment is enabled. The local participant interacts with the plurality of video image streams that can be graphically generated avatars rendered within a synthetic rendering of the three dimensional gaming environment. The graphically generated avatars are displayed within the gaming environment that is displayed to the local participant. In this way, photo-realistic images of the observing participants are presented to the local participant in real-time to effectuate real-time communication between the local participant and the plurality of observing participants within a gaming environment.

The present invention can be implemented within the context of a desktop approach, in accordance with one embodiment of the present invention. As such, participants that are located remotely in physical space can interact with each other in a photo-realistic audio and video manner in close proximity in a gaming environment.

While the methods of embodiments illustrated in flow charts 300A, 300B, 300C, and 400 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Preferred embodiments of the present invention, a method and system for real-time image rendering to enable video communication in a gaming environment, is thus described. While the present invention has been described in particular embodiments, it should be appreciated that the present invention should not be construed as limited by such embodiments, but rather construed according to the below claims.

What is claimed is:

1. A method of real-time rendering in a gaming environment to create an interactive experience, comprising:
   capturing a plurality of real-time video streams of a local participant from a plurality of camera viewpoints;
   generating real-time renderings of said local participant based on said plurality of real-time video streams by applying a new view synthesis technique, said real-time renderings taken from a perspective of a remote participant located remotely in said gaming environment, wherein said new view synthesis technique comprises an image-based visual hull technique that comprises approximating a visual hull of said local participant by projecting contours associated with said local participant into three-dimensional space and computing an intersection of resulting frusta; and
   sending said real-time renderings to said remote participant for viewing within said gaming environment.

2. The method of claim 1, further comprising:
   incorporating said real-time renderings comprising real-time photo-realistic features of said local participant into a graphically generated avatar, said graphically generated avatar representing said local participant in said gaming environment; and
   sending said graphically generated avatar incorporating said real-time renderings to said local participant for viewing within said gaming environment.

3. The method of claim 2, further comprising:
   directing movement of said graphically generated avatar according to said local participant's eye gaze.

4. The method as described in claim 1, wherein said generating real-time renderings of said local participant further comprises:
   generating a three-dimensional geometric model of said local participant from said plurality of real-time video streams as said real-time renderings.

5. The method as described in claim 1, wherein said generating real-time renderings of said local participant further comprises:
   rendering said real-time renderings from a second location of said remote participant with respect to a first location of said local participant within a coordinate space of said gaming environment.

6. The method as described in claim 5, further comprising:
   enabling a change in at least one of said first and second locations by allowing said local participant and said remote participant to navigate through said coordinate space; and
   modifying said real-time renderings to reflect said change in at least one of said first and second locations.

7. The method as described in claim 1, further comprising:
   blending said real-time renderings within a synthetic rendering of said gaming environment; and
   displaying said real-time renderings that are blended within said gaming environment at a display viewable by said second participant to enable real-time video communication for interactive gaming between said local participant and said remote participant within said gaming environment.

8. The method as described in claim 1, wherein said gaming environment comprises a three dimensional gaming environment.

9. The method as described in claim 1, further comprising:
   personifying said graphically generated avatar to said local participant by illustrating real-time emotion of said local participant through said video image stream comprising representative said real-time photo-realistic features of said local participant.

10. The method as described in claim 1, further comprising:
generating other real-time renderings of said local participant based on said plurality of real-time video streams by applying said new view synthesis technique, said other real-time renderings taken from a perspective of another participant located remotely in said gaming environment; and
sending said other real-time renderings to said another participant for viewing within said gaming environment.

11. The method of claim 1, further comprising:
obtaining parameters using a single uncalibrated target to calibrate cameras used for said capturing.

12. A method of real-time rendering in a gaming environment to create an interactive experience, comprising:
capturing a plurality of real-time video streams of a local participant from a plurality of camera viewpoints;
generating a video image stream in real-time of said local participant based on said plurality of real-time video streams by applying a new view synthesis technique, said video image stream rendered from a perspective of a remote participant located remotely in said gaming environment, wherein said new view synthesis technique comprises an image-based visual hull technique that comprises approximating a visual hull of said local participant by projecting contours associated with said local participant into three-dimensional space and computing an intersection of resulting frusta; and
incorporating said video image stream comprising real-time photo-realistic features of said local participant into a graphically generated avatar, said graphically generated avatar representing said local participant in said gaming environment.

13. The method as described in claim 12, wherein said generating said video image stream further comprises:
rendering said video image stream from a second location of said remote participant with respect to a first location of said local participant within a coordinate space of said gaming environment.

14. The method as described in claim 13, further comprising: enabling a change in at least one of said first and second locations by allowing said local participant and said remote participant to navigate through said coordinate space; and
modifying said video image stream to reflect said change in at least one of said first and second locations.

15. The method as described in claim 12, further comprising:
blending said graphically generated avatar incorporating said video image stream within a synthetic rendering of said gaming environment; and
displaying said graphically generated avatar incorporating said video image stream within said gaming environment at a display viewable by said remote participant to enable real-time video communication for interactive gaming between said local participant and said remote participant within said gaming environment.

16. The method as described in claim 12, further comprising:
personifying said graphically generated avatar to said local participant by illustrating real-time emotion of said local participant through said video image stream comprising representative said real-time photo-realistic features of said local participant.

17. The method as described in claim 12, wherein said generating said video image stream further comprises:
generating a three dimensional geometric model of said local participant based on said plurality of real time video streams by applying said new view synthesis technique; and
generating said video image stream of said local participant from said three dimensional geometric model.

18. The method as described in claim 12, further comprising:
generating a real-time audio output from audio of said local participant to enable real-time audio communication in said gaming environment between said local participant and said remote participant.

19. The method as described in claim 12, further comprising:
varying a total of said plurality of camera viewpoints when capturing said plurality of real-time video streams of said local participant to vary image quality in said plurality of video image streams.

20. The method as described in claim 12, further comprising:
performing non-photorealistic processing of said plurality of video image streams resulting in a non-photorealistic cartoon rendering of said plurality of video image streams.

* * * * *

UNITED STATES PATENT AND TRADEMARK OFFICE
CERTIFICATE OF CORRECTION

PATENT NO. : 7,285,047 B2
APPLICATION NO. : 10/688148
DATED : October 23, 2007
INVENTOR(S) : Daniel G. Gelb et al.

Page 1 of 1

It is certified that error appears in the above-identified patent and that said Letters Patent is hereby corrected as shown below:

In column 7, Line 5, after "of the" insert -- needed parameters. The target comprises a 10-inch cube with four colored squares on --.

Signed and Sealed this

Twenty-fourth Day of November, 2009

David J. Kappos
*Director of the United States Patent and Trademark Office*